United States Patent
Jarry

(10) Patent No.: US 9,344,013 B2
(45) Date of Patent: May 17, 2016

(54) VEHICLE SEAT COMPRISING A MOTORIZED ADJUSTABLE PART, ELECTRIC CONTROL UNIT OF A MOTOR VEHICLE

(71) Applicant: Faurecia Sièges d'Automobile, Nanterre (FR)

(72) Inventor: Benoit Jarry, Caen (FR)

(73) Assignee: Faurecia Sièges d'Automobile, Nanterre (FR)

(*) Notice: Subject to any disclaimer, the term of this patent is extended or adjusted under 35 U.S.C. 154(b) by 102 days.

(21) Appl. No.: 13/955,252

(22) Filed: Jul. 31, 2013

(65) Prior Publication Data
US 2014/0035337 A1 Feb. 6, 2014

(51) Int. Cl.
B60N 2/48 (2006.01)
H02N 2/14 (2006.01)
B60N 2/02 (2006.01)
B60N 2/06 (2006.01)
B60N 2/22 (2006.01)
H02N 2/06 (2006.01)

(52) U.S. Cl.
CPC ............ H02N 2/14 (2013.01); B60N 2/0232 (2013.01); B60N 2/0252 (2013.01); B60N 2/06 (2013.01); B60N 2/22 (2013.01); B60N 2/482 (2013.01); B60N 2/4805 (2013.01); B60N 2/4829 (2013.01); H02N 2/06 (2013.01); B60N 2002/0272 (2013.01)

(58) Field of Classification Search
CPC .. B60N 2/4817; B60N 2/4814; B60N 2/4829; B60N 2/4808; B60N 2/0232; B60N 2/06; B60N 2/22; B60N 2/4805; B60N 2/0252; B60N 2/482; A47C 7/38; H02N 2/14

USPC .......................................................... 297/410
See application file for complete search history.

(56) References Cited

U.S. PATENT DOCUMENTS

| 4,404,632 A | 9/1983 | Harada | |
|---|---|---|---|
| 2007/0145803 A1* | 6/2007 | Kopetzky et al. | 297/410 |
| 2011/0031796 A1* | 2/2011 | Hong | 297/410 |
| 2011/0037306 A1 | 2/2011 | Schueler et al. | |
| 2011/0210698 A1* | 9/2011 | Sakai | 320/109 |

FOREIGN PATENT DOCUMENTS

FR  002991926 A1 * 12/2013
WO  WO 2008/083405  7/2008
WO  WO2014033392 A1 * 3/2014

OTHER PUBLICATIONS

French Search Report Application No. 12 57597 reported on Mar. 27, 2013.

* cited by examiner

*Primary Examiner* — Milton Nelson, Jr.
(74) *Attorney, Agent, or Firm* — Miller, Matthias & Hull LLP

(57) ABSTRACT

A motor vehicle seat comprising an adjustable part, a fixed part, and an adjustable mechanism comprising a traveling wave piezoelectric motor having a rotor and a stator, the stator comprising two distinct power terminals connected to an electronic control unit adapted to operate according to three operating modes comprising: a locked operating mode in which the power terminals are not supplied power; a motorized operating mode in which two AC voltages are applied to the two power terminals; and a free operating mode in which an AC voltage is applied to one power terminal while the other is not supplied with power.

9 Claims, 4 Drawing Sheets

VEHICLE SEAT COMPRISING A MOTORIZED ADJUSTABLE PART, ELECTRIC CONTROL UNIT OF A MOTOR VEHICLE

CROSS-REFERENCE TO RELATED APPLICATIONS

This application claims priority under 35 USC §119 and the Paris Convention to French Patent Application No. FR 12 57597, filed on Aug. 3, 2012.

FIELD OF THE DISCLOSURE

The invention relates to vehicle seats comprising an adjustable part which can be moved relative to a fixed part.

The invention more particularly relates to a motor vehicle seat comprising an adjustable part which can be moved relative to a fixed part, as well as a mechanism for adjusting the position of the adjustable part relative to the fixed part.

The adjustable part can be, for example, a seat back, a seat bottom, or a head rest.

In certain applications, there is a need for the ability to rapidly move the adjustable part of the seat relative to the fixed part, for example rapidly lowering the head rest, reclining the seat back, or sliding the seat, which in the case of a motorized application involves a supplemental mechanism for releasing the adjustable part.

SUMMARY OF THE DISCLOSURE

One aim of the invention is to eliminate this supplemental mechanism.

To this effect, the invention proposes a vehicle seat of the type in question, characterized by said adjustment mechanism comprising:

a first member intended to be connected to one of the adjustable and fixed parts, a second member intended to be connected to the other of the adjustable and fixed parts, a traveling wave piezoelectric motor having a rotor that drives the first member and a stator which is solidly connected to the second member, the stator comprising at least two distinct power terminals, the at least two power terminals of the piezoelectric motor being connected to an electronic control unit adapted to operate in at least three operating modes comprising:

a locked operating mode in which the electronic unit does not supply power to the power terminals;

a motorized operating mode in which the electronic control unit applies at least two AC voltages respectively to at least two power terminals; and a free operating mode in which the electronic control unit applies an AC voltage to at least one power terminal and does not supply power to the other power terminals.

By these arrangements, the electronic power supply unit can be operated in three operating modes: locked, motorized, or free. In locked mode, the piezoelectric motor supplies a strong holding torque which has the advantage of allowing the seat back to be immobilized relative to the seat bottom. In the motorized mode where two AC supply voltages, phase-shifted relative to each other, for example by 90°, are respectively supplied to the two power terminals of the traveling wave piezoelectric motor, movement of the movable part can be motorized, requiring no effort by the user. Lastly, in the free operating mode, the movement of the adjustable part relative to the fixed part can be achieved with reduced friction torque due to the alternating current supplied to only one of the power terminals. Rapid movement of the adjustable portion is thus possible, for example by gravity or manually.

In preferred embodiments of the invention, it is possible to utilize one or more of the following arrangements:

the piezoelectric motor is a rotary motor;
the piezoelectric motor is a linear motor;
the rotor of the traveling wave piezoelectric motor is connected to the first member by means of a reduction gear;
the seat comprises a sensor able to detect the position and/or speed of the adjustable part relative to the fixed part;
the fixed part is a seat back and the adjustable part is a head rest of the seat;
the fixed part is a seat bottom and the adjustable part is a seat back; and
the fixed part is a seat rail fixed section adapted for attachment to the floor of a vehicle and the adjustable part is a seat rail movable section mounted translationally on the seat rail fixed section.

Another object of the invention is an electronic control unit for a motor vehicle, adapted for connection to at least two power terminals of a piezoelectric motor of a vehicle seat as described above and for operating according to at least three operating modes comprising:

a locked operating mode in which the electronic control unit does not supply power to the power terminals;

a motorized operating mode in which the electronic control unit applies at least two AC voltages respectively to at least two power terminals; and a free operating mode in which the electronic control unit applies an AC voltage to at least one of the power terminals and does not supply power to the other power terminals.

Another object of the invention is a motor vehicle comprising a vehicle seat as described above as well as an electronic control unit adapted for connection to at least two power terminals of a piezoelectric motor of the vehicle seat, the electronic unit being adapted to operate according to at least three operating modes comprising a locked operating mode in which the electronic control unit does not supply power to the power terminals;

a motorized operating mode in which the electronic control unit applies at least two AC voltages respectively to at least two power terminals; and a free operating mode in which the electronic control unit applies an AC voltage to at least one of the power terminals and does not supply power to the other power terminals.

BRIEF DESCRIPTION OF THE DRAWINGS

Other features and advantages of the invention will be apparent from the following description of one of its embodiments, provided as a non-limiting example and with reference to the attached drawings.

In the drawings.

DETAILED DESCRIPTION OF THE DISCLOSURE

In the various figures, the same references are used for identical or similar items.

Figure 1:
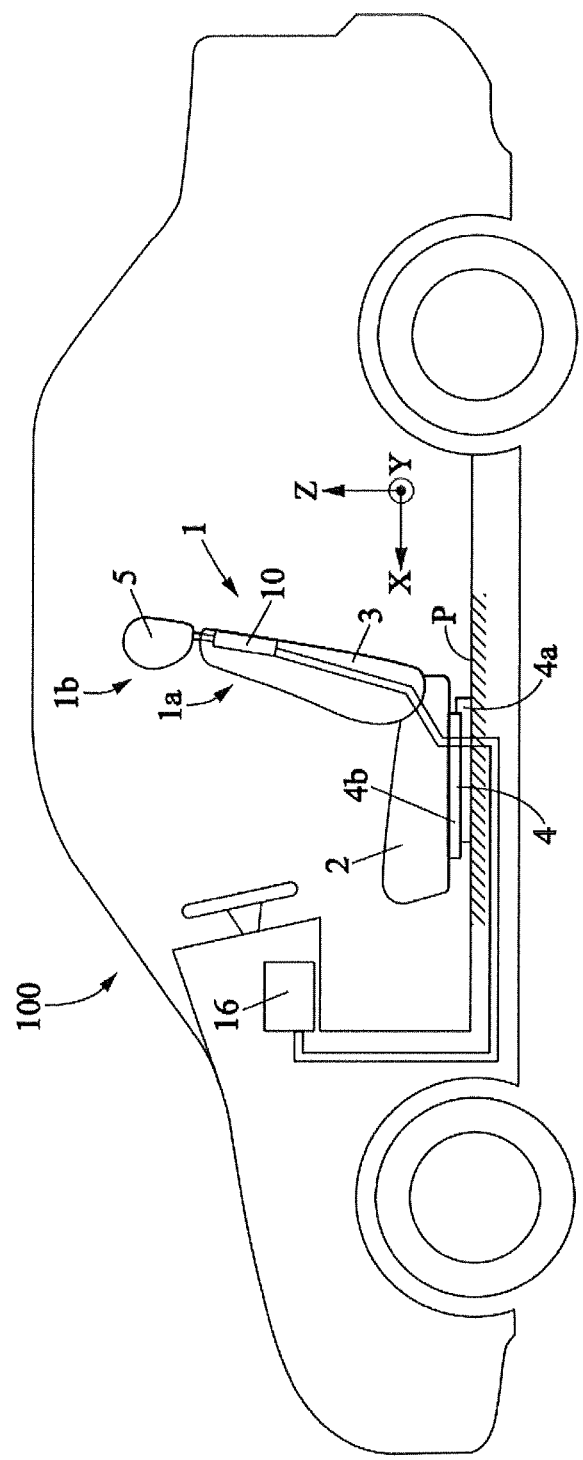
FIG. 1 is a schematic view of a motor vehicle according to an embodiment of the invention.

First referring to FIG. 1, a motor vehicle 100 according to an embodiment of the invention is illustrated in FIG. 1. It contains a floor P extending in a horizontal plane XY, on which a vehicle seat 1 is mounted.

The seat 1 comprises a seat bottom 2 which extends in the longitudinal direction X of the horizontal plane XY, and a seat back 3 which extends substantially in a vertical direction Z perpendicular to the horizontal plane XY. Also defined here is the transverse direction Y of the horizontal plane XY, perpendicular to the longitudinal direction X.

In the rest of the description, the terms "front" and "back" and their synonyms are understood as representing the front and back of the vehicle or vehicle seat in the longitudinal direction X. The terms "top", "bottom", "upper", "lower", and their synonyms are relative to the vertical axis Z.

Figure 2:
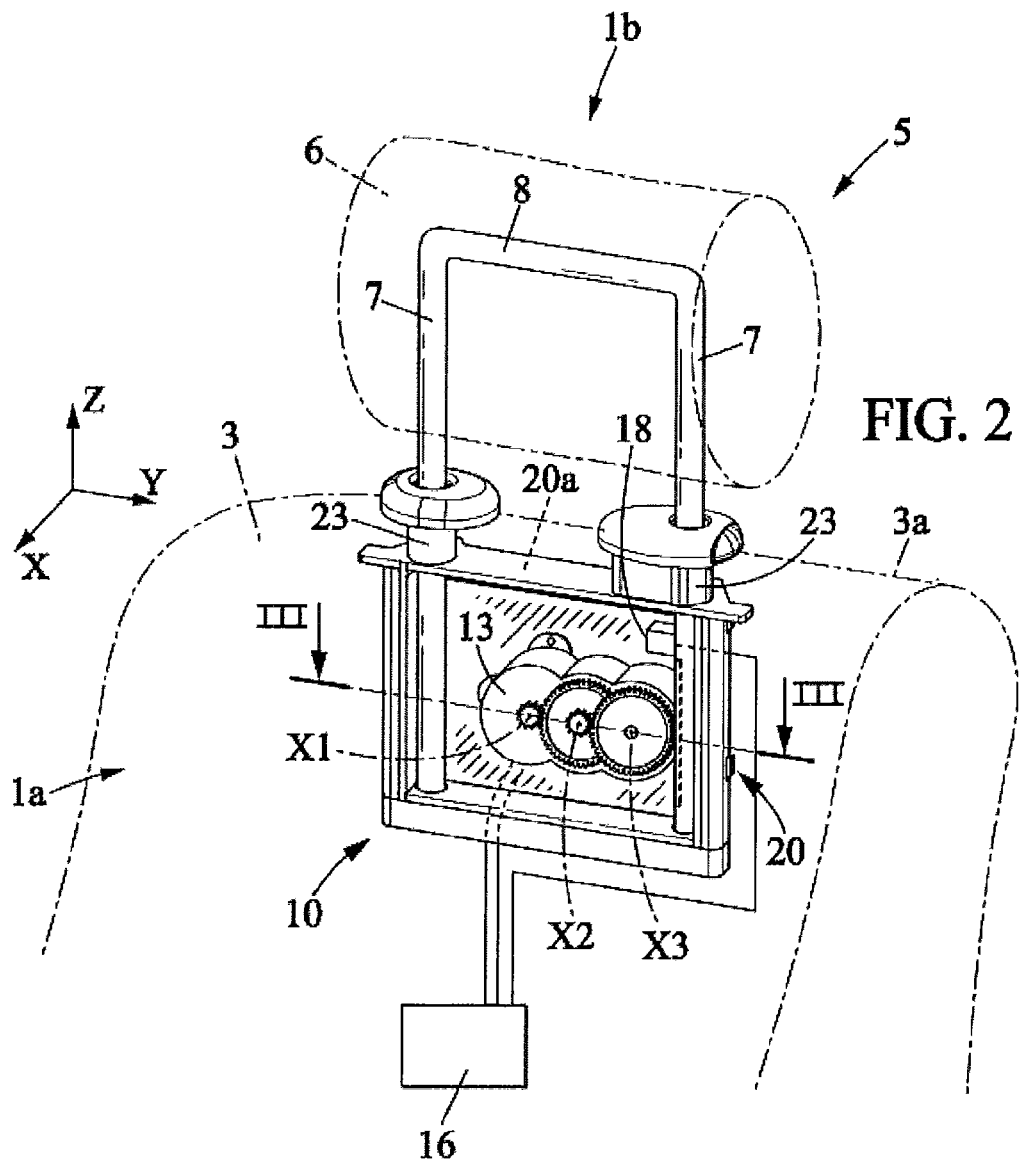
FIG. 2 is a perspective view of a motor vehicle seat according to an embodiment of the invention.

In FIGS. 1 and 2, the seat 1 can comprise a head rest 5 mounted on an upper portion of the seat back 3, opposite the seat bottom 2.

In one embodiment of the invention, the seat back 3 and the head rest 5 can be moved relative to one another by means of an adjustment mechanism 10 housed within the seat back 3.

The fixed part can thus comprise the back 3 of the seat and the adjustable portion can comprise the head rest 5 of the seat.

The head rest 5 comprises, for example, padding 6 and a metal insert 8 supporting the padding 6 and in the shape of an inverted U composed of two vertical rods 7 with free ends extending outside the upholstery 6 and connected by a horizontal part located inside the upholstery 6.

The adjustment mechanism 10 represented in FIG. 2 can then comprise a housing 20 that is generally rectangular in shape and is located inside the bulk of the seat back 3, as well as two sheaths 23 extending vertically Z inside the padding of the seat back 3 from the upper surface 20a of the housing to the top 3a of the seat back 3 and which accept the vertical rods 7.

In addition, the adjustment mechanism 10 may comprise:
a first member 11 intended to be connected to one of the adjustable 1b and fixed 1a parts,
a second member 12 intended to be connected to the other of the adjustable 1b and fixed 1a parts,
a traveling wave piezoelectric motor 13 having a rotor 14 driving the first member 11 and a stator solidly connected to the second member 12, the stator comprising at least two distinct power terminals 15a, 15b.

Figure 3:
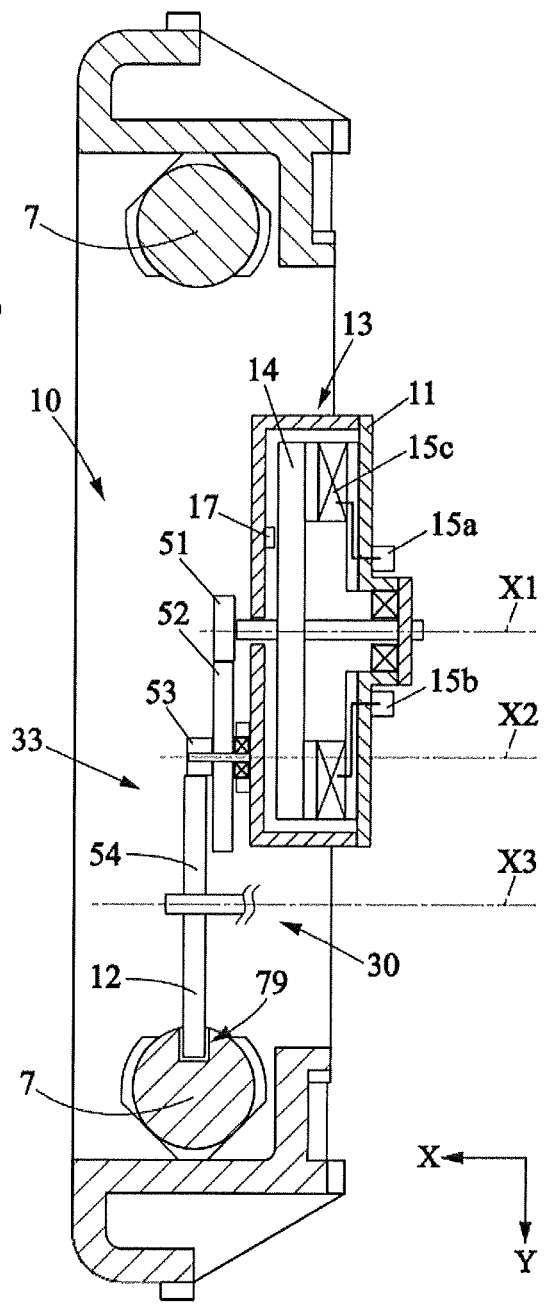
FIG. 3 is a transverse cross-sectional view of an adjustment mechanism of the vehicle seat in FIG. 2, along lines III-III of FIG. 2.

In the embodiment in FIGS. 2 and 3, the first member 11 can be connected to the adjustable part 1b, meaning to the head rest 5, and can comprise the vertical rods 7.

The second member 12 can be connected to the fixed part 1a, i.e. the seat back 3, and can comprise the housing 20.

The housing 20 can accommodate the piezoelectric motor 13, being solidly attached to the stator of said motor.

The rotor 14 can turn about a substantially longitudinal axis X1 and can be for example coupled to a reduction gear 30, for example to an input member, such as first gear 51 of said reduction gear 30.

An output member of the reduction gear 30 can be coupled to one or both of the vertical rods 7, for example by means of a rack and pinion.

The nominal rotation speed of the piezoelectric motor can be, for example, less than 500 rpm. Preferably, a piezoelectric motor with a nominal rotation speed of about 200 rpm can be chosen, for example 180 rpm. The maximum torque of the piezoelectric motor 13 can be greater than 1 Newton-meter for example.

Such torque is greater than what is usually known for conventional motors in these applications. For a given power, the increase in torque allows lowering the rotation speed, and thus potentially reducing the noise generated, at least at high frequencies.

With reference to FIG. 3, a reduction gear 30 is arranged between the piezoelectric motor 13 and the second member 12, for example a vertical rod 7. The reduction gear 30 has a reduction ratio that is preferably greater than or equal to 150.

The reduction gear 30 can comprise a first reduction stage formed by a double reduction gear 33.

This first stage in the reduction 33 is presented in the illustrated example as a succession of two parallel gear sets, with a first gear 51 of small diameter, secured to the input member 11; this first gear 51 of axis X1 drives a second gear 52 of larger diameter so that there is a resulting reduction in the rotation speed, for example at a ratio of about 3. The second gear 52 is centered on an axis X2 and is rigidly coupled to a third gear 53 of small diameter which in turn drives a fourth gear 54 of larger diameter turning about an axis X3.

The fourth gear 54 can, in this embodiment, constitute the output member of the reduction gear and engage in a rack and pinion 79 arrangement in the lower face of one of the vertical rods 7.

This reduction step presents, for example, a reduction ratio of 3×3=9.

In one variant, one or two belt reduction units could be used in place of the reduction units with parallel gear sets described above.

In other variants, the double reduction gear 33 can be replaced by a cycloidal speed reducer, a planetary reduction gear, or any other reduction mechanism, for example the reduction mechanisms described in document FR 11 54146.

In some alternative embodiments, the reduction gear 30 can comprise, after exiting the first reduction stage, a second reduction stage consisting of one of the reduction mechanisms mentioned above.

The vehicle 100 also comprises an electronic control unit 16 connected to the power terminals 15a, 15b of the piezoelectric motor.

This electronic control unit 16 can be integrated with the piezoelectric motor 13 or placed at another location in the vehicle as indicated in FIG. 1.

The electronic control unit 16 is, in particular, adapted to operate according to at least three operating modes which will now be described with reference to FIGS. 4a to 4c.

Figure 4A:
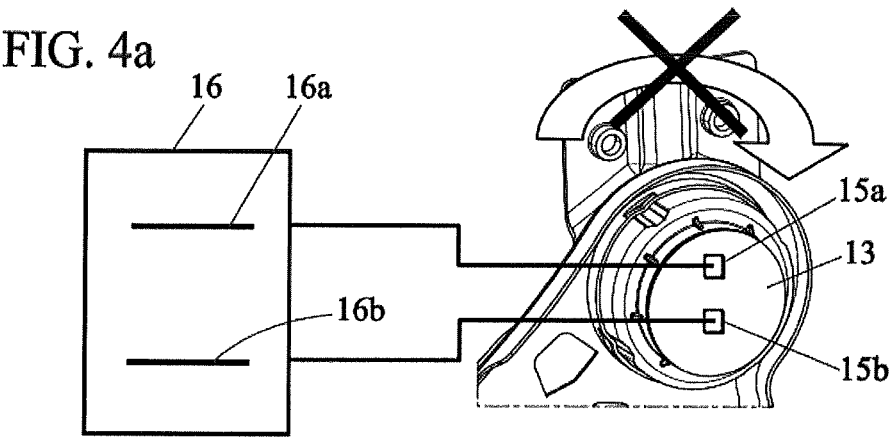
FIG. 4*a* is a schematic view of a vehicle seat adjustment mechanism and of the control terminal supply voltages in a locked operating mode of an electronic control unit.

In a first embodiment referred to as "locked operating mode", the electronic control unit 16 does not supply power to the two power terminals 15a, 15b, as illustrated for example in FIG. 4a.

The electronic control unit 16 can also apply constant voltages 16a, 16b, for example zero voltages, to the two power terminals 15a, 15b.

The strong holding torque of the piezoelectric motor 13 then allows immobilizing the adjustable part 1b relative to the fixed part 1a.

Figure 4B:
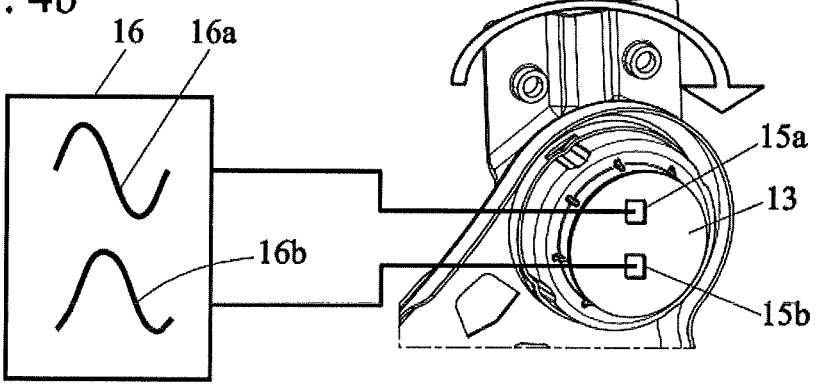
FIG. 4*b* is a schematic view of a vehicle seat adjustment mechanism and of the control terminal supply voltages in a motorized operating mode of an electronic control unit.

In a second embodiment referred to as "motorized operating mode", the electronic control unit 16 can apply two AC voltages 16a, 16b respectively to the two power terminals 15a, 15b as illustrated for example in FIG. 4b.

Said AC voltages can advantageously be phase shifted relative to one another.

Said AC voltages can, for example, be sinusoidal voltages.

The respective frequency, voltage, and phase shift of the supply voltages can be controlled by the electronic control unit 16 in a manner that modulates the speed and torque of the piezoelectric motor 13.

The power terminals 15a, 15b are connected to piezoelectric elements 15c of the stator, arranged circularly and facing the rotor 14, and the phase-shifted AC voltages can therefore create mechanical waves of a predetermined shape in the stator capable of inciting rotational movement at the rotor 14.

In this manner, the electronic control unit 16 can control the movement of the adjustable part 1b relative to the fixed part 1a.

Figure 4C:
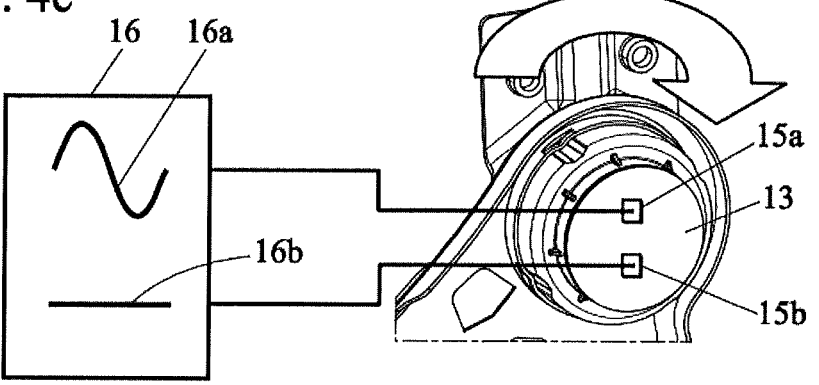
FIG. 4c is a schematic view of a vehicle seat adjustment mechanism and of the control terminal supply voltages in a free operating mode of an electronic control unit.

Lastly, in a third embodiment referred to as "free operating mode", the electronic control unit 16 can apply an AC voltage 16a to one power terminal 15a and not supply power to the other power terminal 15b as illustrated for example in FIG. 4c.

The electronic control unit 16 can also apply a constant voltage 16b, for example a zero voltage, to the other power terminal 15b.

The application of an AC voltage to only one power terminal of the stator creates stationary mechanical waves in the piezoelectric elements 15c of the stator which are incapable of inciting rotational movement in the rotor 14.

On the other hand, these mechanical waves reduce the holding torque of the piezoelectric motor and therefore allow the adjustable part 1b to be moved freely relative to the fixed part 1a.

The vehicle seat can also comprise a first sensor 17 able to detect the position and/or speed of the rotor 14.

The first sensor 17 can, for example, be a Hall effect sensor.

The electronic control unit 16 can use the information originating from the first sensor 17 to control the piezoelectric motor 13.

As a variant, the seat can comprise a second sensor 18 able to detect the position and/or speed of the adjustable part 1b.

The electronic control unit 16 can use the information originating from the second sensor 18 to control the piezoelectric motor 13, for example in order to bring the adjustable part 1b back into position after a rapid displacement was made while the electronic control unit 16 was in free operating mode.

Any type of traveling wave piezoelectric motor 13 can be used for the invention, and in particular, the piezoelectric motor can be rotary or linear and can comprise one or more stators.

In different embodiments of the invention, the fixed 1a and adjustable 1b parts can be different from the fixed and adjustable parts described in relation to FIGS. 2 and 3.

In general, the hinge mechanism 10 can cause a hinge to move as illustrated in FIGS. 4a to 4c.

Thus, in one embodiment of the invention, the seat back 3 comprises a frame surrounded by padding and can be mounted on the seat bottom 2 by means of a hinge on a transverse axis, allowing adjustment of the angle of the seat back 3 relative to the seat bottom 2. The fixed part 1a can then comprise the seat bottom 2 and the adjustable part 1b can comprise the seat back 3.

In another embodiment of the invention, the seat bottom 2 can, for example, be mounted on the floor P by means of rails 4 adapted for sliding in the longitudinal direction X in order to adjust the longitudinal position of the seat bottom 2 relative to the floor P. The rails 4 can comprise a fixed section 4a adapted for attachment to the floor P of the vehicle, as well as a movable section 4b translationally mounted on the fixed section 4a.

The fixed part 1a can then comprise the fixed section and the adjustable part 1b can comprise the movable section 4b.

In all embodiments, the seat can comprise a mechanism 10 for adjusting the position of the adjustable part relative to the fixed part as described above.

The invention claimed is:

1. A motor vehicle seat comprising an adjustable part which can be moved relative to a fixed part, as well as a mechanism for adjusting the position of the adjustable part relative to the fixed part,
   said adjustment mechanism comprising:
   a first member intended to be connected to one of the adjustable and fixed parts,
   a second member intended to be connected to the other of the adjustable and fixed parts,
   a traveling wave piezoelectric motor having a rotor that drives the first member and a stator which is solidly connected to the second member, the stator comprising at least two distinct power terminals,
   the at least two power terminals of the piezoelectric motor being connected to an electronic control unit adapted to operate in at least three operating modes comprising:
   a locked operating mode in which the electronic control unit does not supply power to the power terminals
   a motorized operating mode in which the electronic control unit applies at least two AC voltages respectively to at least two power terminals; and
   a free operating mode in which the electronic control unit applies an AC voltage to at least one power terminal and does not supply power to the other power terminals.

2. The vehicle seat according to claim 1, wherein the piezoelectric motor is a rotary motor.

3. The vehicle seat according to claim 1, wherein the piezoelectric motor is a linear motor.

4. The vehicle seat according to claim 1, wherein the rotor of the traveling wave piezoelectric motor is connected to the first member by a reduction gear.

5. The vehicle seat according to claim 1, comprising a sensor able to detect the position and/or speed of the adjustable part relative to the fixed part.

6. The vehicle seat according to claim 1, wherein the fixed part is a seat back and the adjustable part is a head rest of the seat.

7. The vehicle seat according to claim 1, wherein the fixed part is a seat bottom and the adjustable part is a seat back.

8. The vehicle seat according to claim 1, wherein the fixed part is a seat rail fixed section adapted for attachment to a floor of a vehicle and the adjustable part is a seat rail movable section mounted translationally on the seat rail fixed section.

9. A motor vehicle comprising a vehicle seat according to claim 1.

* * * * *